(12) United States Patent
Mukherjee et al.

(10) Patent No.: US 8,392,437 B2
(45) Date of Patent: Mar. 5, 2013

(54) METHOD AND SYSTEM FOR PROVIDING DEDUPLICATION INFORMATION TO APPLICATIONS

(75) Inventors: Anirban Mukherjee, West Bengal (IN); Anindya Banerjee, Pune (IN)

(73) Assignee: Symantec Corporation, Mountain View, CA (US)

( * ) Notice: Subject to any disclaimer, the term of this patent is extended or adjusted under 35 U.S.C. 154(b) by 368 days.

(21) Appl. No.: 12/724,222

(22) Filed: Mar. 15, 2010

(65) Prior Publication Data

US 2011/0225211 A1    Sep. 15, 2011

(51) Int. Cl.
*G06F 7/00*    (2006.01)
*G06F 17/30*   (2006.01)
(52) U.S. Cl. .................. 707/758; 707/802; 707/821
(58) Field of Classification Search .............. 707/609, 707/705, 758, 790, 802, 821
See application file for complete search history.

(56) References Cited

U.S. PATENT DOCUMENTS

| | | | |
|---|---|---|---|
| 7,747,584 B1 * | 6/2010 | Jernigan, IV | 707/692 |
| 2008/0294696 A1 * | 11/2008 | Frandzel | 707/200 |
| 2009/0210640 A1 * | 8/2009 | Davis | 711/162 |
| 2010/0042790 A1 * | 2/2010 | Mondal et al. | 711/161 |
| 2010/0070698 A1 * | 3/2010 | Ungureanu et al. | 711/108 |
| 2010/0077013 A1 * | 3/2010 | Clements et al. | 707/822 |

* cited by examiner

*Primary Examiner* — Marc Somers
(74) *Attorney, Agent, or Firm* — Wilmer Cutler Pickering Hale and Dorr LLP (57) ABSTRACT

A method of maintaining and providing information relating to file deduplication. A first portion of a first file and a second portion of a second file that contain a first content are identified. A first header associated with the first portion is created. The first header identifies the first portion and the second portion containing the first content. The first header is appended to a storage location of the first content of the first portion to form a first data structure for the first file. The first data structure is stored. The first data structure is provided to an application requesting the first file so that duplicate data processing can be avoided by the application. The first data structure is updated when the first file or the second file are altered. A similar process may occur to generate a data structure for the second file.

20 Claims, 8 Drawing Sheets

METHOD AND SYSTEM FOR PROVIDING DEDUPLICATION INFORMATION TO APPLICATIONS

TECHNICAL FIELD

Embodiments of the present invention generally relate to computer systems that provide file deduplication functionality.

BACKGROUND

In general, software applications read data by sending file requests to a file system or file system interface. Files often contain portions that are duplicates of other file portions. As a result, applications may read and process duplicate files or duplicate regions within the files multiple times. Unfortunately, reading and processing duplicate files or regions within the files increases disk usage, processing power, and memory consumption.

Recently, file systems have been used to deduplicate files and content in order to detect identical files or identical portions of a file. Identification of identical portions of one or more files can be used to maintain a single copy of the content instead of maintaining multiple copies of the same content. Thus, duplicate files or regions within files may be reduced to a single footprint instead of multiple footprints, thereby reducing storage requirements. Deduplication has therefore been used to reduce memory storage requirements within a file system.

Unfortunately, file system deduplication processes keep internal the information regarding which files and which file portions are duplicated. They do not provide this information to outside applications. Thus, if an application needs to access two files having duplicate content, the application will perform multiple reads and processing on the data thereby wasting valuable resources, e.g., processing power, network bandwidth, disk reads, etc.

For instance, deduplication processes may be performed in order to remove duplicate files from a backup repository. In some instances, failing to track the files or portions thereof that contain the same content causes backup applications to read those files or portions thereof even though the file system has already read, processed and deduplicated those files or portions thereof. Unnecessarily deduplicating and reading files that are copies unfortunately waste valuable resources of the system.

SUMMARY OF THE INVENTION

Accordingly, a need has arisen to track the files or portions thereof, that use the same content, as discovered via a deduplication process and then make that information available to other applications for efficient processing of data. Tracking the files or portions thereof that contain the same content improves processing power, network bandwidth, the number of required reads, and the amount of storage consumption required, etc., within a computer system. It will become apparent to those skilled in the art after reading the detailed description of the present invention that the embodiments of the present invention satisfy the above mentioned needs.

According to one embodiment, a method of maintaining and providing information relating to data deduplication includes identifying a first portion of a first file and a second portion of a second file that contain a same first content. A first header associated with the first portion is created. The first header identifies the first portion and the second portion containing the first content. The first portion is identified as within the first file and said second portion is identified as within the second file.

In one embodiment, the first header is appended to the storage location of the first content of the first portion to form a first data structure for the first file. The first data structure is stored. It is appreciated that the first data structure may be stored as a portion of a file system performing the deduplication.

In one embodiment, a third portion of the first file that contains a second content different from content within portions of the second file is identified. Accordingly, a second header associated with the third portion may be generated. The second header identifies the third portion of the first file. The second header may be appended to a storage location of the second content of the third portion. It is appreciated that data structure for the second file may similarly be created.

Advantageously, responsive to an application requesting access to the first file, a file system may provide the first data structure to the application requesting access to the first file. Using this first data structure, including the header, an application may be able to determine that this portion of the first file has already been processed by the application previously, in which, the application can advantageously skip processing of the duplicated portion.

It is appreciated that any changes to a portion of one or more files may be tracked by updating the headers. Thus, the first data structure may be updated as needed.

As a result, shared content between various portions of a file or different files is accessed (and processed) once despite multiple access requests, thereby reducing the number of reads required of the file system and reducing the required processing of applications. For example, a subsequent request to access a block of shared content does not trigger a subsequent read as long as the shared content is read once, thereby reducing disk reads, processing time, network bandwidth, etc. According to one embodiment, the file system may provide the created data structure to one or more applications, e.g., backup applications, archival applications, data loss prevention (DLP) applications, virus scan applications, indexing applications, etc. Furthermore, tracking files or portions thereof that contain the same content enables a file system to locate a desired file or content in a timely fashion.

In other embodiments of the present invention, a computer readable storage medium is described having instructions stored thereon that when executed by a computer system implement the method of maintaining and providing information relating to data deduplication as described above.

In still other embodiments of the present invention, a storage cluster system is described that includes a computer system having a file system and one or more processors coupled to a computer readable storage media and configurable to execute computer readable code stored on the computer readable storage media which causes the file system to implement a method of maintaining and providing information relating to data deduplication, the method including: identifying a first portion of a first file and a second portion of a second file that contain a first content; creating a first header associated with the first portion, wherein the first header identifies the first portion and the second portion containing the first content and wherein the first portion is identified as within the first file and the second portion is identified as within the second file; appending the first header to a storage location of the first content of the first portion to form a first data structure for the first file; and storing the first data structure.

Embodiments include the storage cluster system as described above wherein the method further includes identifying a third portion of the first file that contains a second content different from content within portions of the second file.

Embodiments include the storage cluster system as described above wherein the method further includes creating a second header associated with the third portion, wherein the second header identifies the third portion of the first file; and appending the second header to a storage location of the second content of the third portion.

Embodiments include the storage cluster system as described above wherein the method further includes responsive to an application requesting the first file, providing the first data structure to the application requesting the first file.

Embodiments include the storage cluster system as described above wherein the method further includes creating a second header associated with the second portion, wherein the second header identifies the second portion and the first portion containing the first content and wherein the first portion is identified as within the first file and the second portion is identified as within the second file; appending the second header to a storage location of the first content of the second portion to form a second data structure for the second file; and storing the second data structure.

Embodiments include the storage cluster system as described above wherein the method further includes creating a third header associated with a third portion of the second file that contains a third content different from a content within portions of the first file, wherein the third header identifies the third portion of the second file; and appending the third header to a storage location of a third content of the third portion to form the second data structure for the second file.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "creating," "generating," "appending," "storing," "thawing," "sending," "determining," "providing," "updating," "accessing," "associating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Exemplary Operating Environment

Figure 1:
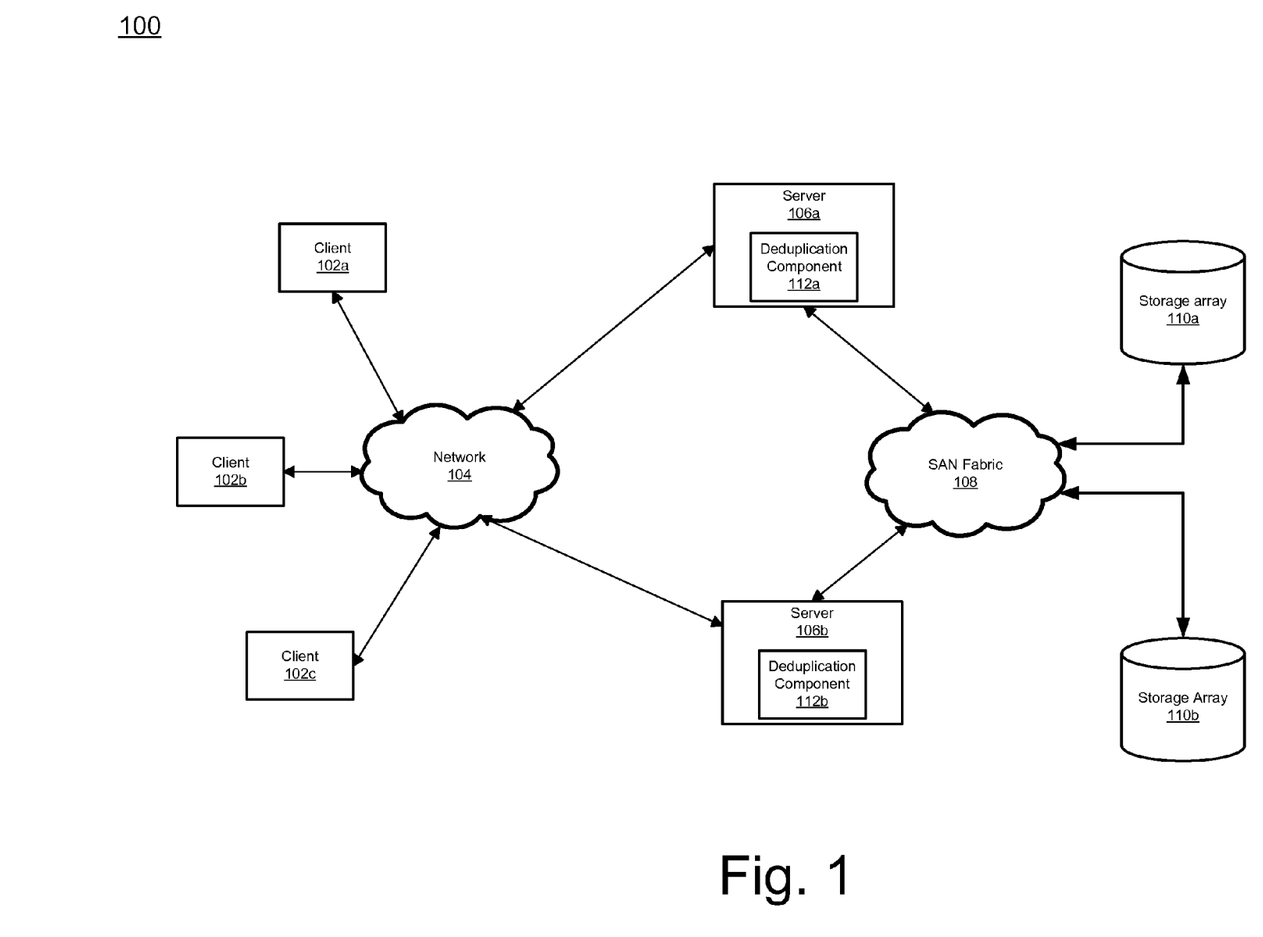
FIG. 1 shows a block diagram of an exemplary computer system operating environment, in accordance with one embodiment of the present invention.

FIG. 1 shows a block diagram of an exemplary operating environment in which various embodiments of the present invention can operate. Exemplary operating environment 100 includes clients 102a-c, networks 104, servers 106a-b, storage area network (SAN) fabric 108, and storage arrays 110a-b. It is appreciated that that components of exemplary operating environment 100 are exemplary and more or fewer components may be present in various configurations. It is appreciated that operating environment may be part of a distributed computing environment, a cloud computing environment, a client server environment, etc.

Client systems 102a-c access information on storage arrays 110a-b via servers 106a-b using, for example, a web browser or other suitable client communication software (not shown). FIG. 1 depicts the use of a network 104 such as the Internet for exchanging data, but the present disclosure is not limited to the Internet or any particular network-based environment.

Each of servers 106a-b can have multiple clients (e.g., clients 102a-c) connected thereto. Servers 106a-b can be a variety of server types including, but not limited to, database servers, network file system (NFS) servers, and application servers. In some embodiments, servers 106a-b have access to shared storage of storage arrays 110a-b with each of servers 106a-b having its own respective clustered file system and its own built-in lock manager thereby allowing servers 106a-b to access the shared storage. Each of servers 106a-b may communicate with each other over a network (e.g., a redundant private network) (not shown). Servers 106a-b may be linked to storage arrays 110a-b in a variety of ways including, fibre channel.

Servers 106a-b may respectively use a file system and execute deduplication processes 112a-b to detect identical files or identical portions of files stored in storage arrays 110a-b, in accordance with one embodiment. This information may then be advantageously provided by a file system to applications requesting files from the server. For example, the deduplication processes in accordance with one embodiment of the present invention track the files or portions thereof that contain the same content by associating the portions containing the same content together via headers associated with the blocks. A header for a data portion indicates all the files and file locations that use the data portion. According to one embodiment, the tracking is achieved by the deduplication components 112a-b generating a header based on the identified portions. The header associates portions of a file or files that contain the same content together. The header is appended the physical location where the content of the identified portions are stored. Appending the header to the portions forms a data structure according to one embodiment of the present invention.

Upon a request to access a file, the data structures (including the headers) that correspond to the portions of the file are reported by the file system to the application making the request for the file. The application can then advantageously use this information to determine if a file portion has already been processed previously by the application. In which case, the duplicate file portion can be ignored by the application. In other embodiments, the duplicate file portion is also not read by the storage unit.

As a result, shared content between various portions of a file or different files can be accessed and processed once despite multiple access requests, thereby reducing the number of reads performed and also reducing application processing. For example, a subsequent request to access a piece of shared content does not trigger a subsequent read as long as the shared content was read once, thereby reducing the number of disk reads and reducing processing resources, network bandwidth, etc. According to one embodiment, the file system may provide the created data structure to one or more applications that process large amounts of the server's data, e.g., backup applications, archival applications, data loss prevention (DLP) applications, virus scan applications, indexing applications, etc. Furthermore, tracking files or portions thereof that contain the same content enables a file system to locate a desired file or content in a timely fashion.

Figure 2A:
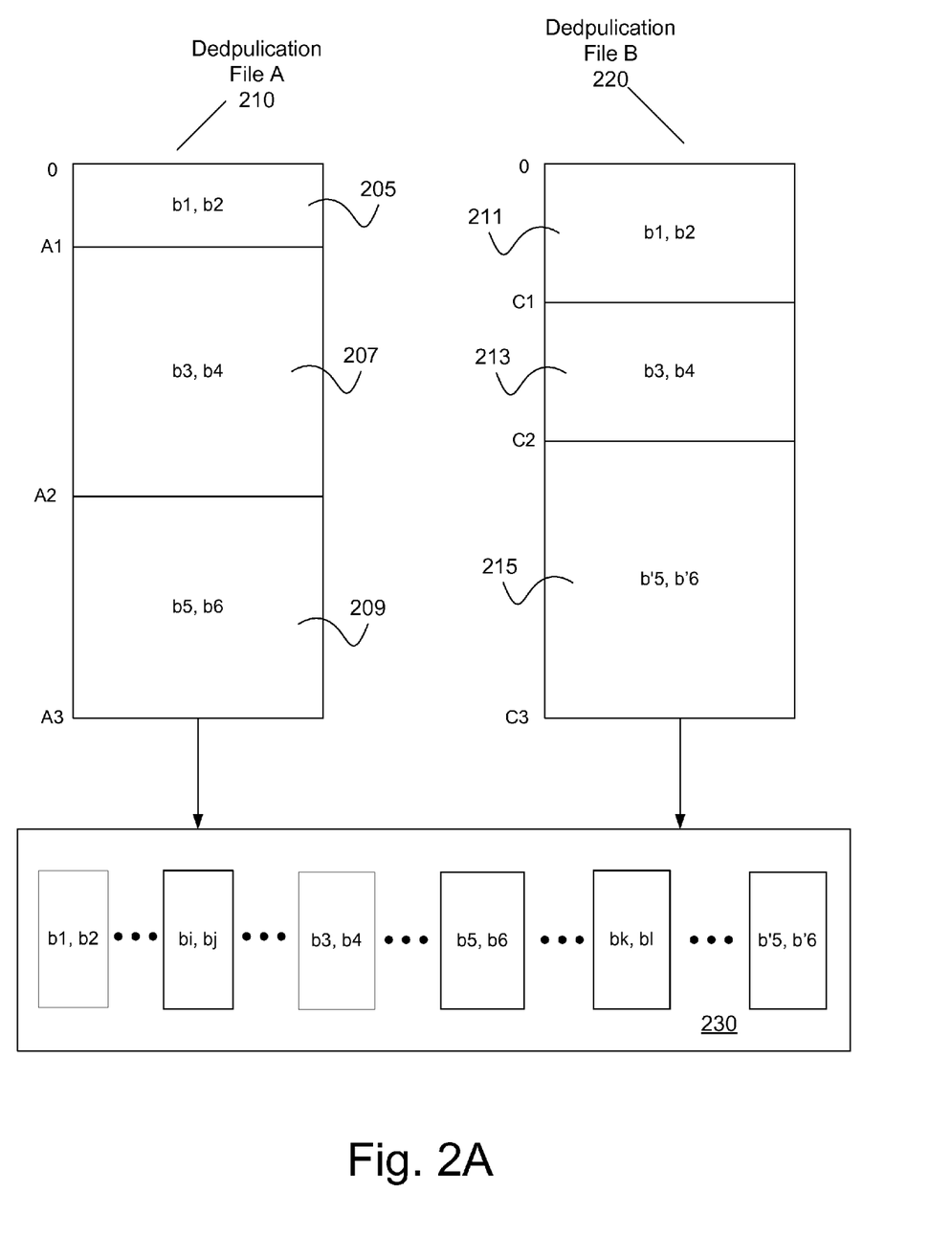
FIGS. 2A, and 2B show data structures associated with a deduplication process in accordance with one embodiment of the present invention.
Figure 2B:
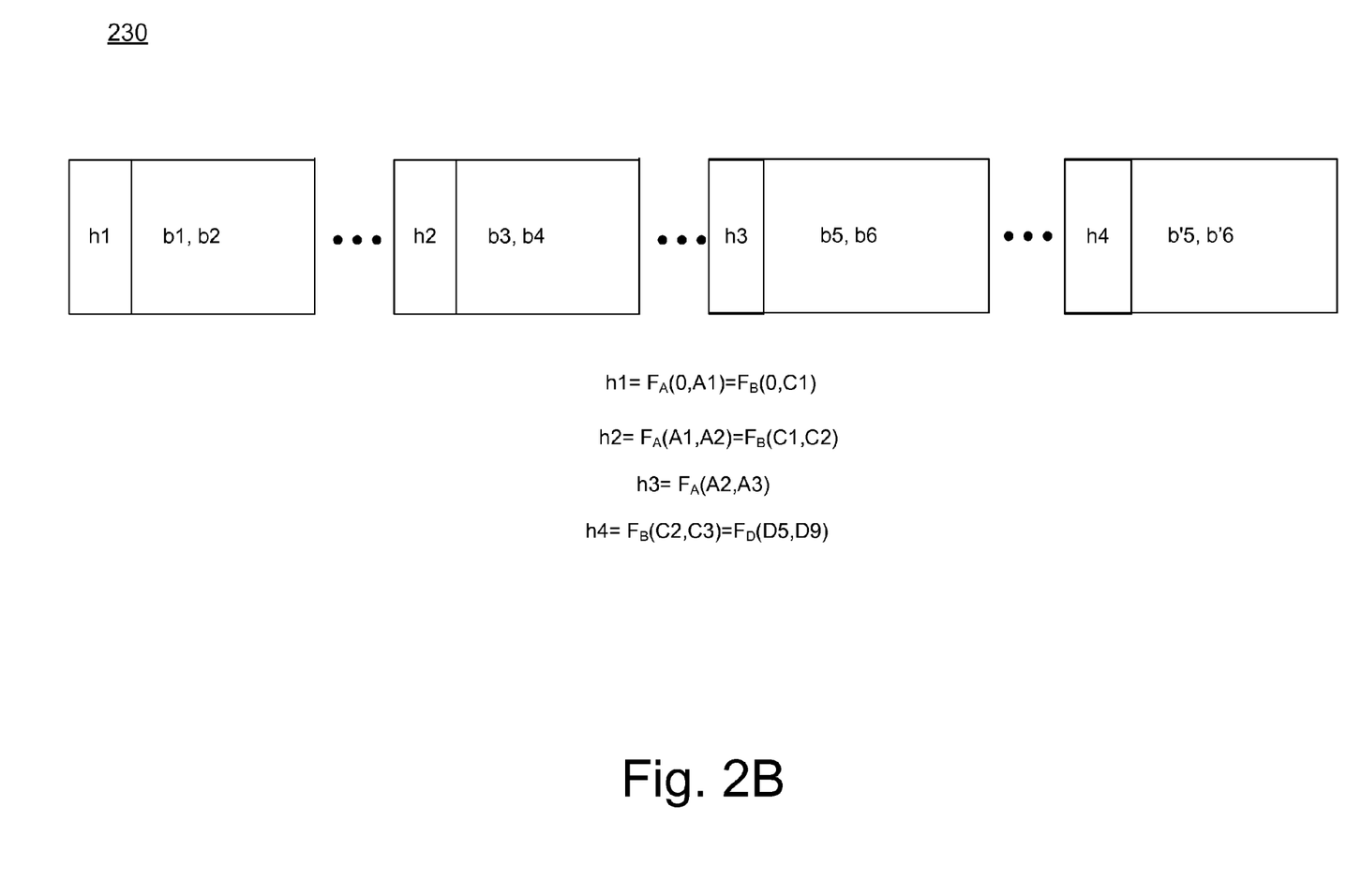

Referring now to FIGS. 2A and 2B, data structures associated with a deduplication process in accordance with one embodiment of the present invention are shown. Referring to FIG. 2A, each file is read during a deduplication process. For example, file A that comprises data blocks (b1,b2), (b3,b4), and (b5,b6) is read. In contrast, file B that comprises data blocks (b1,b2), (b3,b4), and (b'5,b'6) is read. In one exemplary embodiment, file B may be a modified version of file A where the content (b5,b6) is modified to (b'5,b'6).

After a deduplication process is executed, each file is "deduplicated" resulting in the identification of a portion or portions of various files that share a same content, e.g., data blocks (b1,b2), and (b3,b4). Thus, by identifying common content, the content that is shared between two or more files does not need to be stored twice in storage component 230. Deduplicating file A results in deduplication file A data structure 210 and deduplicating file B results in deduplication file B data structure 220.

Forward Mapping of Duplicate Blocks of a File:

According to one embodiment, deduplication of file A data structure 210 provides a plurality of pointers to data blocks (a forward mapping of the file). For example, a first pointer 205 points to the physical address of the storage component 230 where the data blocks (b1,b2) are stored. The data blocks (b1,b2) are associated with a portion 0 to A1 of file A. A second pointer 207 points to the physical address of the storage component 230 where the data blocks (b3,b4) are stored. The data blocks (b3,b4) are associated with a portion A1 to A2 of file A. A third pointer 209 may point to the physical address of the storage component 230 where the data content blocks (b5,b6) are stored. The data blocks (b5,b6) are associated with a portion A2 to A3 of file A.

According to one embodiment, the file A may contain checksum values for each portion, e.g., checksum for the portion A1 to A2. Thus, a mapping may also be present to show the location in the storage component 230 that the checksum value is stored. It is appreciated that the mapping and the checksum values may be stored in a different storage component than the storage component 230.

It is appreciated that deduplication of file B 220 may similarly include a plurality of pointers. For example, a first pointer 211 may point to the physical address of the storage component 230 where the data blocks (b1,b2) are stored. Pointers 205 and 211 point to the same location in the storage component 230, in this instance. The data blocks (b1,b2) are associated with a portion 0 to C1 of file B. A second pointer 213 may point to the physical address of the storage component 230 where the data blocks (b3,b4) are stored. In this exemplary embodiment, pointers 207 and 213 point to the same location in the storage component 230. The data blocks (b3,b4) are associated with a portion C1 to C2 of file B. A third pointer 215 may point to the physical address of the storage component 230 where the data content blocks (b'5,b'6) are stored. The data blocks (b'5,b'6) are associated with a portion C2 to C3 of file B.

Accordingly, a framework for deduplication of files A and B are formed. It is appreciated that the data blocks (b1,b2) and (b3,b4) are only stored once in the storage component 230 despite being referenced by each file A and B individually. Thus, storage consumption is improved. In contrast, data blocks (b5,b6) of file A and (b'5,b'6) of file B are stored individually by the storage component 230 since the data blocks (b5,b6) of file A and (b'5,b'6) of file B differ from one another. It is appreciated that the storage component 230 may comprise other data blocks, e.g., (bi,bj), (bk,bl), etc.

Reverse Mapping of Duplicate Blocks

Referring now to FIG. 2B, formation of deduplication data structures associated with blocks of storage 230 in accordance with one embodiment of the present invention is shown. A plurality of headers, e.g., h1, h2, h3, and h4 are shown associated with the blocks of the storage unit 230.

Each block stored in storage 230 is associated with a respective header. The header indicates the files that use the data in the block and also where in the files the data is used. For example, the first header, e.g., h1, indicates that the content, e.g., (b1,b2), within the portion (0,A1) of file A corresponds to the content, e.g., (b1,b2), within the portion (0,C1) of file B. In one exemplary embodiment, a second header, e.g., h2, indicates that the content, e.g., (b3,b4), with in the portion (A1,A2) of file A is the same as the content, e.g., (b3,b4), with in the portion (C1,C2) of file B. In contrast, a third header, e.g., h3, indicates that the content, e.g., (b5,b6), within the portion (A2,A3) of file A is not common with any other file. In other words, $h1=F_A(0,A1)=F_B(0,C1)$, $h2=F_A(A1,A2)=F_B(C1,C2)$, and $h3=F_A(A2,A3)$.

The framework for deduplication associated with file B is used and a plurality of headers, e.g., h1, h2, and h4, are formed. For example, the first header, e.g., h1, indicates that the content, e.g., (b1,b2), within the portion (0,C1) of file B corresponds to the content, e.g., (b1,b2), within the portion (0,A1) of file A. In one exemplary embodiment, a second header, e.g., h2, indicates that the content, e.g., (b3,b4), within the portion (C1,C2) of file B is the same as the content, e.g., (b3,b4), within the portion (A1,A2) of file A. In contrast, a third header, e.g., h6, indicates that the content, e.g., (b'5,b'6), within the portion (C2,C3) of file B is not common with any portion of file A but is shared with a portion (D5,D9) of file D (not shown). In other words, $h1=F_B(0,C1)=F_A(0,A1)$, $h2=F_B(C1,C2)=F_A(A1,A2)$, and $h4=F_B(C2,C3)=F_D(D5,D9)$.

As described further below, when providing a block of data to an application requesting a file, the header associated with the block of data is also provided so that the application can determine if it already processed that data previously. Optionally, the file system can also avoid reading the data blocks altogether if the application signals that it does not need the data after receiving the associated header. The headers may be transmitted separately from blocks of data. The headers associated with blocks of data may be transmitted to the application via an API.

In other words, the files and any portions thereof containing the same content are tracked and associated with one another. Subsequent requests to access shared content do not trigger a subsequent read and process as long as the shared content was read once and remains unchanged. As a result, the number of reads and application processes are reduced despite multiple access requests to data content that is shared between various portions of a file or different files. Accordingly, the resources of a system are more efficiently utilized by reducing the amount of required processing, reducing the amount of bandwidth consumption, reducing the amount of required storage consumption, etc.

In one embodiment, the file system may provide the created data structure to one or more applications, e.g., backup applications, archival applications, data loss prevention (DLP) applications, virus scan applications, indexing applications, etc., thereby improving system efficiency. Furthermore, tracking files or portions thereof that contain the same content enables a file system to locate a desired file or content in a timely fashion.

Figure 3A:
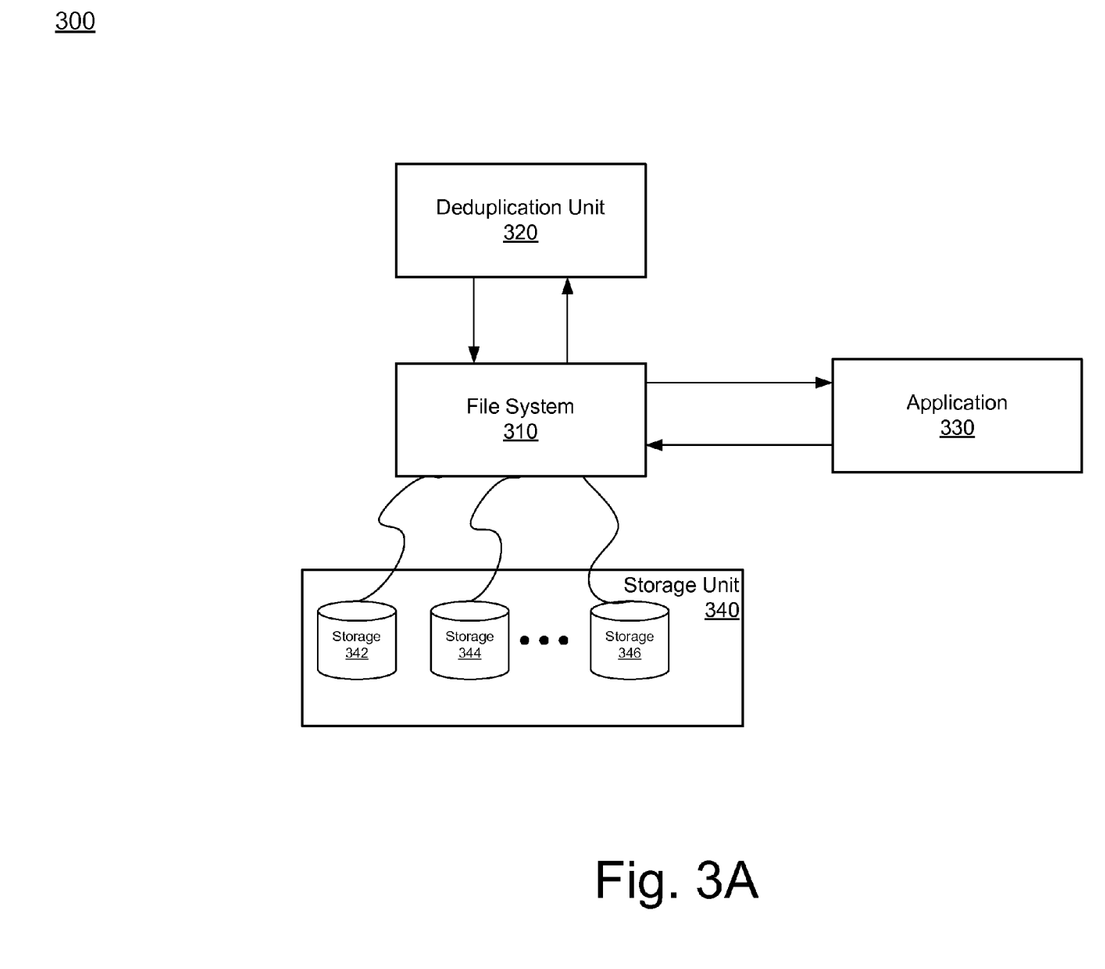
FIGS. 3A and 3B show a block diagram of system comprising a deduplication environment in accordance with another embodiment of the present invention.

Referring now to FIG. 3A, a block diagram of system 300 comprising a deduplication environment in accordance with another embodiment of the present invention is shown. System 300 comprises a file system 310, a deduplication unit 320, a requesting application 330, and a storage unit 340.

It is appreciated that various files, e.g., files A and B from FIGS. 2A-2B, may be periodically deduplicated using the deduplication unit 320, as presented above. Any well known deduplication process can be used. As a result, data structures associated with deduplication of each file may be created, as discussed above. The data structures in accordance with embodiments of the present invention may be stored by the file system 310 and/or the storage unit 340. It is appreciated that the storage unit 340 may further include storage units 342, 344 and 346. Data blocks of files A and B, e.g., (b1,b2), (b3,b4), (b5,b6), and (b'5,b'6), may be stored in one or more storage locations of the storage unit 340.

In one exemplary embodiment, the application 330 may request access to file A which involves the content of the portion (A1,A2) of file A. In response to the request, the file system 310 accesses the data structure associated with file A. This data structure identifies all of the blocks that make up File A (see FIG. 2A) including content (b3,b4). In this example assume that the content (b3,b4) has not been read before by application 330. The file system 310 then provides the content (b3,b4) associated with the portions (A1,A2) of file A, including the header h2 associated with content (b3, b4), to the application 330. The application 330 then processes the data (b3,b4) and stores the result. Importantly, the application records in memory that it processed (b3,b4) or that is has processed portions (A1,A2) of file A.

Subsequent to the read operation, the application 330 may request access to portion (C1,C2) of file B. Similarly, in response to the request, the file system 310 may access the data structure associated with file B. This data structure identifies all the blocks that make up file B, including content (b3,b4). Header h2 indicates that the content (b3,b4) of portion (C1,C2) of file B is the same as the content of portion (A1,A2) of file A. The file system provides application 330 with the header h2 in response to this request. With h2, the application realizes that it has already read and processed the content of portion (A1,A2) of file A in a previous task. Thus, the need to read and process the content (b3,b4) a second time is eliminated. At this time, the application 330 may also signal the file system to prevent (b3,b4) from being read. However, even if (b3,b4) is read and supplied to the application 330, the application 330 will nevertheless ignore the data and will not process the data a second time thereby improving efficiency. The application will merely apply the stored results of processing (b3,b4) to file B or that it has processed portions (A1,A2) of file A.

Accordingly, one read operation may be performed despite multiple access requests for a content shared by one or more files, thereby improving the number of required read operations, application processing efficiency, etc.

Figure 3B:
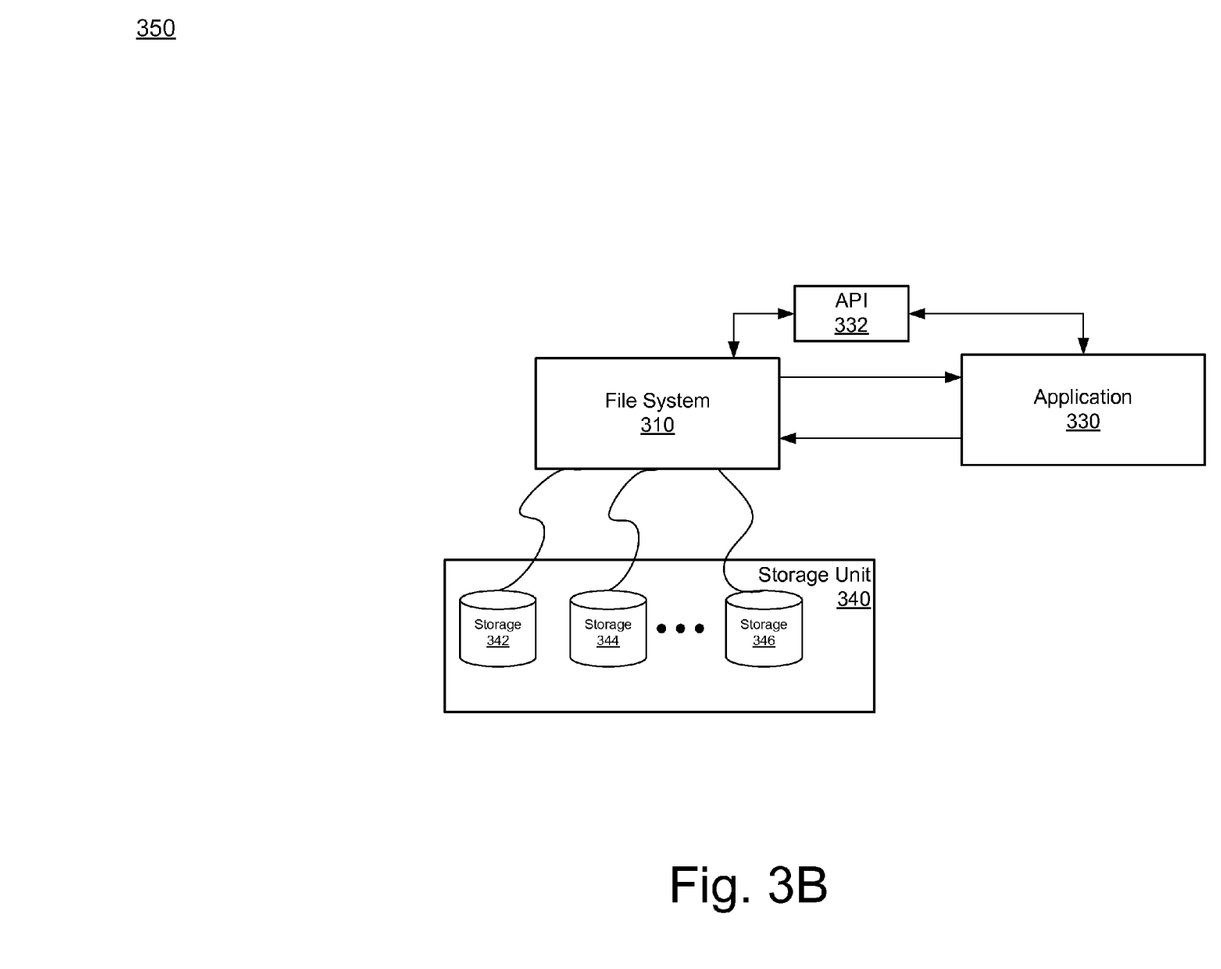

Referring now to FIG. 3B, a block diagram of system 350 comprising a deduplication environment in accordance with another embodiment of the present invention is shown. In this embodiment, an API is used to allow identification of shared segments that may be part of a write or a special command from an application. By identifying the duplicate segments, the file system can be informed and can advantageously perform "incremental" deduplication in response to the command. System 350 comprises the file system 310, the requesting application 330, and the storage unit 340, as discussed above. In this exemplary embodiment, an API 332 is coupled to the application 330 and further coupled to the file system 310.

According to one embodiment, the API 332 receives an indication from the application 330 regarding a file and segments thereof being modified by the application 330, e.g., are part of write operation to file system 310. For example, the application 330 informs the API 332 that file F1 portions (0,A1) and (A2,A3) are part of a write operation. The API 332 identifies shared segments of files, e.g., portions (0,A1) of file F1 and (C1,C2) of file F2 (another file) that are the same. The API 332 reports the identification of the shared segments to the file system 310 and/or to the application 330. As a result, the file system 310 may utilize the identification of the shared segments for incrementally deduplicating the files. For example, portions (0,A1) and (C1,C2) of file F1 and F2 respectively may be deduplicated before storing the result in the storage unit 340. As such, portion (0,A1) of file F1 is not stored in the storage unit 340 because portion (0,A1) of file F1 has the same content as portion (C1,C2) of file F2 already stored by the storage unit 340. In other words, the file system is enabled to utilize the header information for processing, e.g., deduplication processing.

Figure 4:
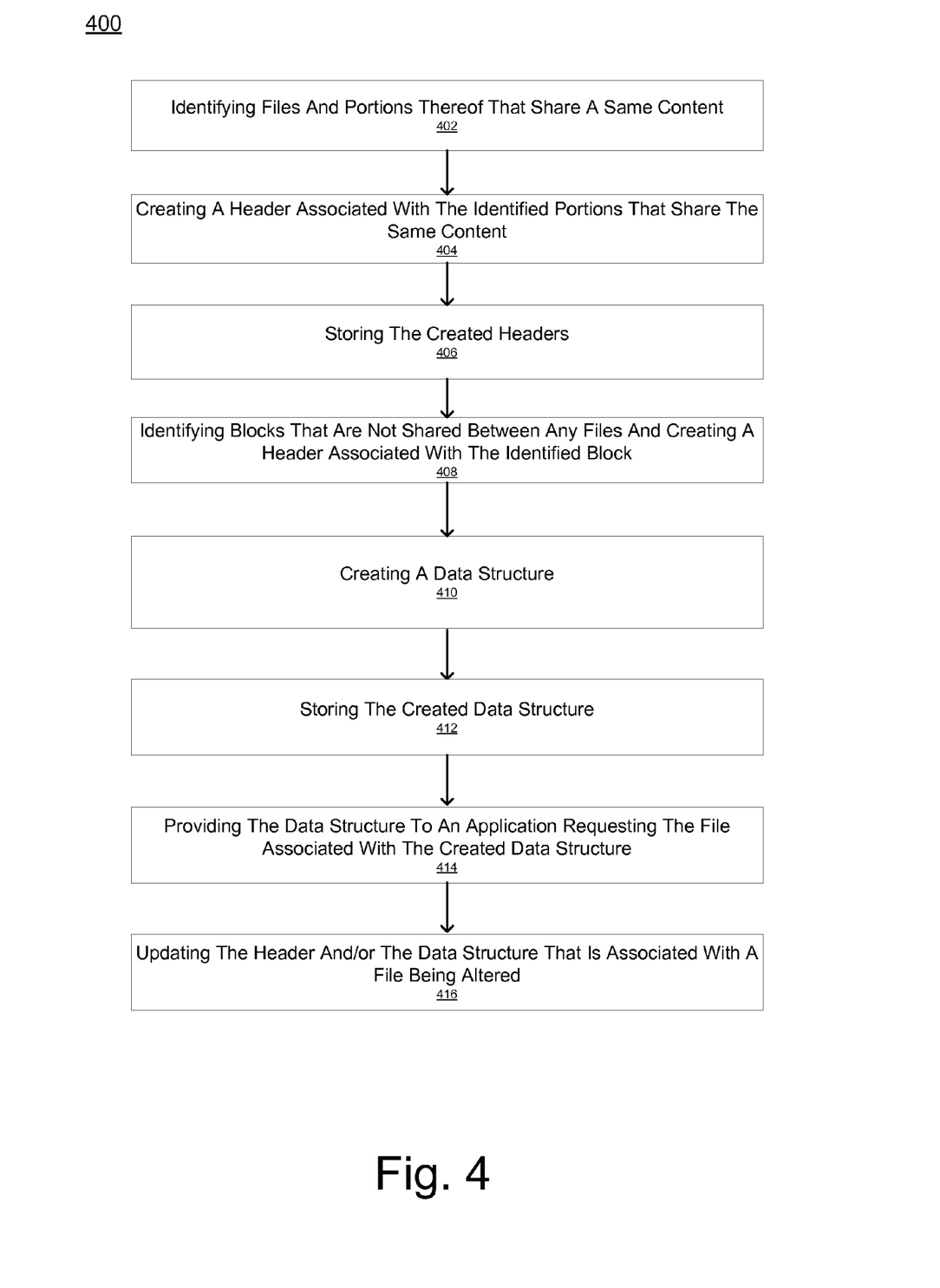
FIG. 4 shows an exemplary flowchart of process of deduplicating in accordance with embodiments of the present invention.

Referring now to FIG. 4, an exemplary flowchart 400 of a process of maintaining and providing data related to file deduplication in accordance with embodiments of the present invention is shown. At step 402 all portions that have been determined by the deduplication process to be shared (e.g., duplicates) across multiple files are identified and the files to which they belong are identified.

For instance, at step 402, a portion of a first file (File A) and a portion of a second file (File B) that contain a first content is identified. For example, portion (0,A1) of file A and portion (0,C1) of file B are identified because they both contain the same data blocks (b1,b2). It is appreciated that other portions containing the same content may also be identified, e.g., portion (A1,A2) of file A and portion (C1,C2) of file B that contain the data blocks (b3,b4) may be identified.

At step 404, a header is created for each portion that is shared among two or more files. Each header indicates the files and file locations at which the portion is used. For instance, at step 404, a first header, e.g., h1 and/or h2, associated with the portion that contains the first content, e.g., (b1,b2) and/or (b3,b4), is created. The header associates portions of a same files or different files that contain the same content to one another. The header definitions are shown in FIG. 2B.

At step 406 of FIG. 4, the headers that were created in step 404 are stored with their respective portions in storage 230. For instance, header h1 is stored with (b1,b2) and header h2 is stored with (b3,b4).

At step 408, blocks that are not shared between any files are identified and a header is created for each that indicates the file that uses the block. For instance, at step 408, a header, e.g., h3, associated with the portion of the first file that contains the third content, e.g., (b5,b6), that is different from the content (b'5,b'6) of the second file may be created. These headers are stored associated with their respective blocks. At this point, all blocks within the storage 230 have respective headers associated with them.

At step 410, a data structure associated with the first file is created which includes pointers to all the blocks within that file. Within the data structure is pointer to each of the blocks. For example, a first pointer points to a location where the first content, e.g., (b1,b2), of the first file (File A) is stored. A second pointer points to a location where the content (b3,b4) of the first file is stored. A third pointer points to a location where the content (b5,b6) of the first file is stored.

At step 412, the created data structures of step 410 are stored in a memory component. At step 414, the stored data structures are used to identify data blocks and their associated headers which are provided to an application requesting access to the first file. For instance, in response to a request to read the first file, the file system provides headers h1 and h2 to the application so that the application can determine if the data has previously been processed. At step 416, the headers and/or the data structures that define the files may be updated responsive to a change to a first file and/or a second file. The updated data structures may be subsequently stored.

It is appreciated that a similar process may be performed to generate a data structure for the second file. Moreover, it is appreciated that the operations described above are not limited to two files. For example, the operations described above are applicable to multiple files and the discussion of the operations with respect to two files is exemplary and not intended to limit the scope of the present invention.

Figure 5:
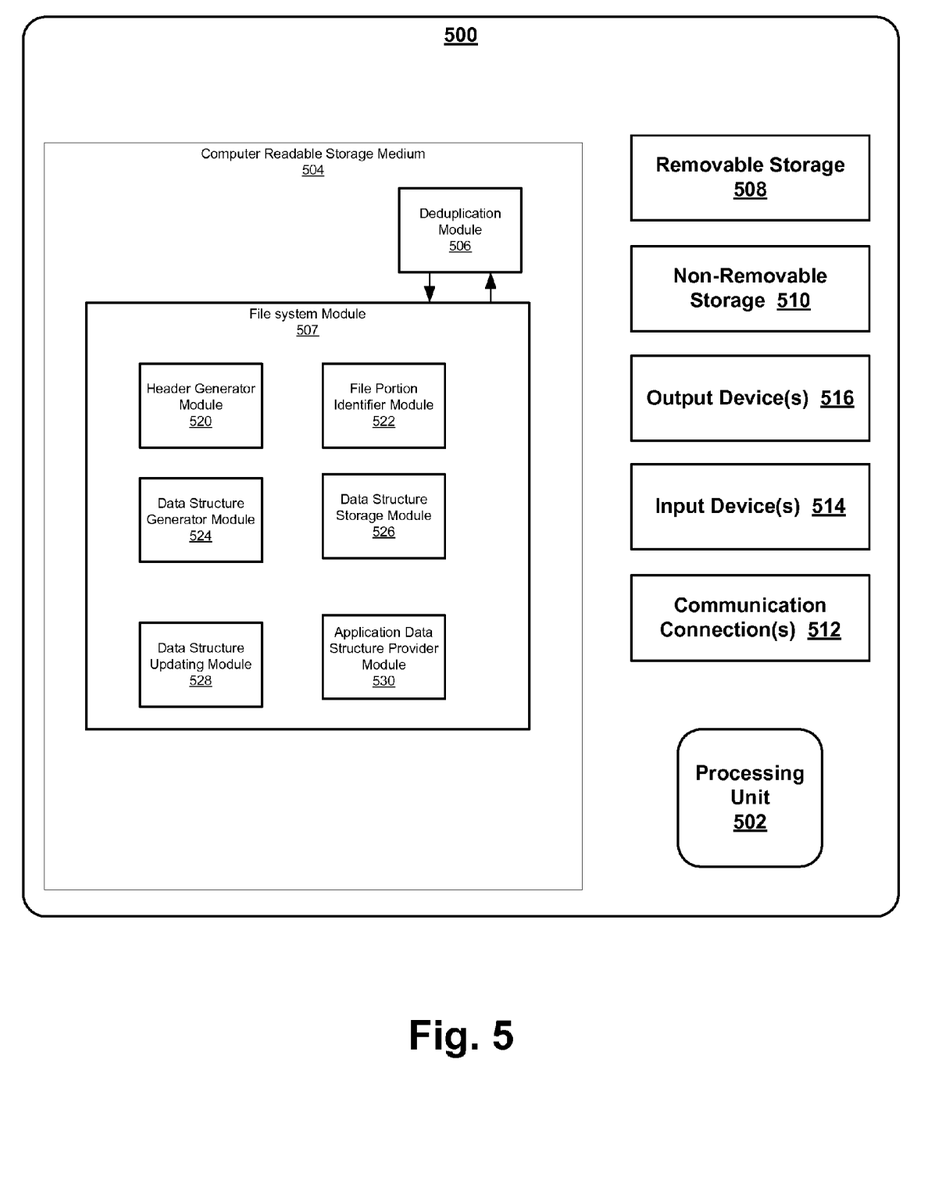
FIG. 5 shows a block diagram of an exemplary computer system in accordance with one embodiment of the present invention.

Referring now to FIG. 5, a block diagram of an exemplary computer system in accordance with one embodiment of the present invention is shown. With reference to FIG. 5, an exemplary system module for implementing embodiments includes a general purpose computing system environment, such as computing system environment 500. Computing system environment 500 may include, but is not limited to, servers (e.g., servers 106a-b), desktop computers, laptops, tablet PCs, mobile devices, and smartphones. In its most basic configuration, computing system environment 500 typically includes at least one processing unit 502 and computer readable storage medium 504. Depending on the exact configuration and type of computing system environment, computer readable storage medium 504 may be volatile (such as RAM), non-volatile (such as ROM, flash memory, etc.) or some combination of the two. Portions of computer readable storage medium 504 when executed facilitates deduplication process according to embodiments of the present invention (e.g., process 400).

Additionally, computing system environment 500 may also have additional features/functionality. For example, computing system environment 500 may also include additional storage (removable and/or non-removable) including, but not limited to, magnetic or optical disks or tape. Such additional storage is illustrated by removable storage 508 and non-removable storage 510. Computer storage media includes volatile and nonvolatile, removable and non-removable media implemented in any method or technology for storage of information such as computer readable instructions, data structures, program modules or other data. Computer readable storage medium 504, removable storage 508 and nonremovable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 500. Any such computer storage media may be part of computing system environment 500.

Computing system environment 500 may also contain communications connection(s) 512 that allow it to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 512 may allow computing system environment 500 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 512 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 500 may also have input device(s) 514 such as a keyboard, mouse, pen, voice input device, touch input device, remote control, etc. Output device(s) 516 such as a display, speakers, etc. may also be included. All these devices are well known in the art and are not discussed at length.

In one embodiment, computer readable storage medium 504 includes a file system module 507 which includes a header generator module 520, a file portion identifier module 522, a data structure generator module 524, a data structure storage module 526, a data structure updating module 528, and an application data structure provider 530. The file system module 507 communicates with a data deduplication module 506 that may be integrated within the file system module 507.

The header generator module 520 generates headers, e.g., h1, h2, h3, and h4 according to embodiments of the present invention. The file portion identifier module 522 identifies portions of the files that contain a same content and/or different content. For example, the file portion identifier module 522 identifies portion (0,A1) of file A and portion (0,C1) of file B containing a same content (b1,b2). In contrast, the file portion identifier module 522 may identify portion (A2,A3) of file A and portion (C2,C3) of file B that contain different contents, e.g., (b5,b6) versus (b'5,b'6).

The data structure generator module 524 generates a data structure for each file by assembling pointers that point to each location where the content of various portions of the file are stored. The data structure storage module 526 stores the created data structures and the data structure updating module 528 updates the data structures when one or more files are altered, e.g., deleted or modified. The data structure updating module 528 may subsequently store the updated data structure via the data structure storage module 526. The data structure provider module 530 provides a data structure associated with a file being requested by an application.

Figure 6:
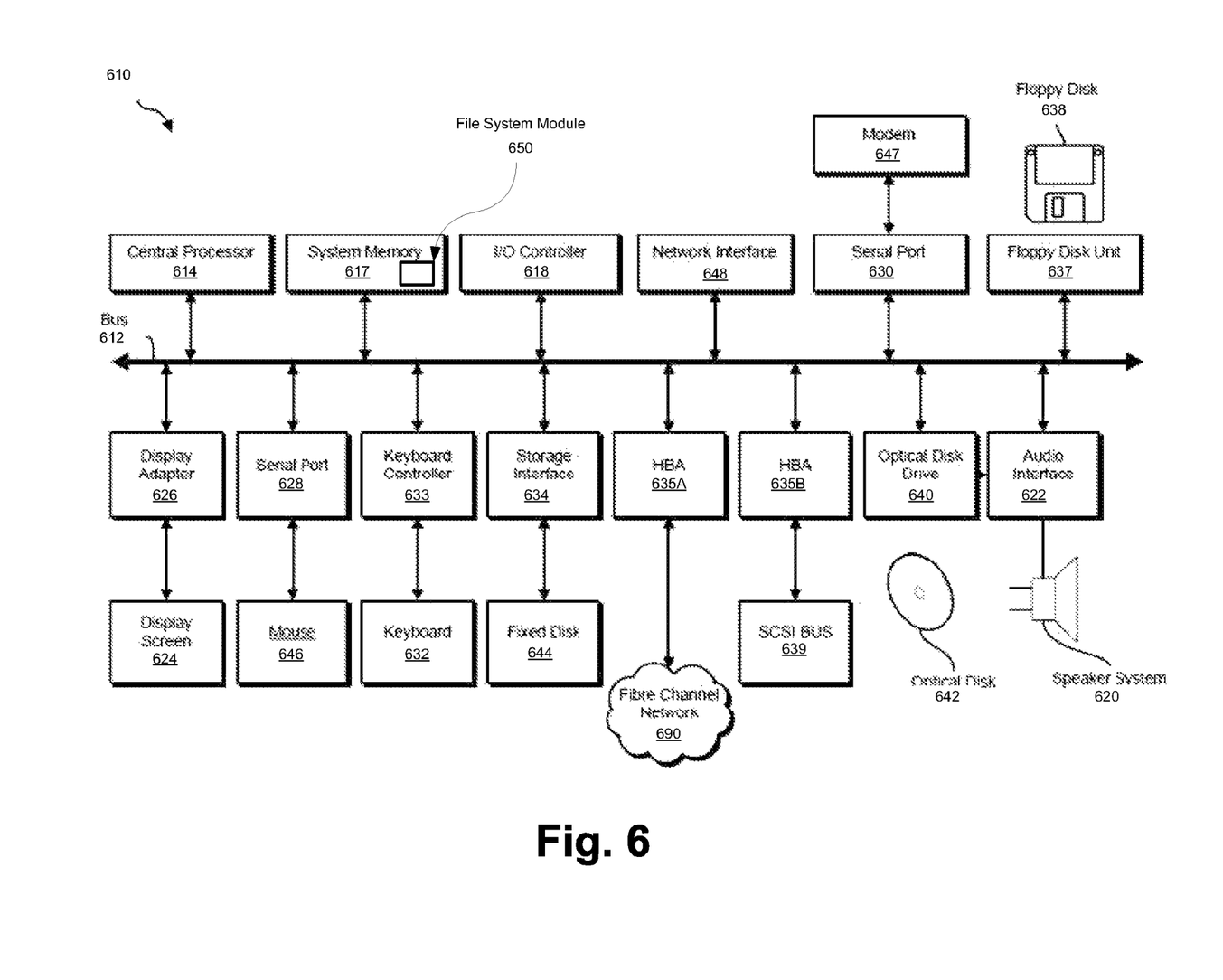
FIG. 6 shows a block diagram of another exemplary computer system in accordance with one embodiment of the present invention.

Referring now to FIG. 6, a block diagram of another exemplary computer system in accordance with one embodiment of the present invention is shown. FIG. 6 depicts a block diagram of a computer system 610 suitable for implementing the present disclosure. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612). System memory 617 includes file system module 650 which is operable to maintain and provide information related to data deduplication according to embodiments of the present invention.

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present disclosure. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Thus, embodiments of the present invention provide a mechanism and method to create, maintain and provide information regarding deduplicate files and portions thereof. By using the information provided by embodiments of the present invention, subsequent requests to access a shared content do not trigger a subsequent read as long as the shared content is read once and remains unchanged. As a result, the number of reads is reduced despite multiple access requests to data content that is shared between various portions of a file or different files. Moreover, applications can determine duplicate data and avoid processing it twice. In one embodiment, the file system may provide the created data structure to one or more applications, e.g., backup, archival, data loss prevention (DLP), virus scan, indexing, etc., thereby reducing disk reads, processing, network bandwidth, storage consumption, etc. Furthermore, tracking files or portions thereof that contain the same content enables a file system to locate a desired file or content in a timely fashion.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of maintaining and providing information relating to data deduplication comprising:
   identifying a first portion of a first file and a second portion of a second file that contain a first content;
   creating a first header associated with said first portion, wherein said first header identifies said first portion and said second portion containing said first content and wherein said first portion is identified as within said first file and said second portion is identified as within said second file;
   appending said first header to a storage location of said first content of said first portion to form a first data structure for said first file; and
   storing said first data structure.

2. The method as described in claim 1 further comprising:
   identifying a third portion of said first file that contains a second content different from content within portions of said second file.

3. The method as described in claim 2 further comprising:
   creating a second header associated with said third portion, wherein said second header identifies said third portion of said first file; and
   appending said second header to a storage location of said second content of said third portion.

4. The method as described in claim 1 further comprising:
   responsive to an application requesting said first file, providing said first data structure to said application requesting said first file.

5. The method as described in claim 4 further comprising:
   creating a second header associated with said second portion, wherein said second header identifies said second portion and said first portion containing said first content and wherein said first portion is identified as within said first file and said second portion is identified as within said second file;
   appending said second header to a storage location of said first content of said second portion to form a second data structure for said second file; and
   storing said second data structure.

6. The method as described in claim 5 further comprising:
   responsive to an application requesting access to said second file, providing said second data structure to said application requesting said second file.

7. The method as described in claim 5 further comprising:
   creating a third header associated with a third portion of said second file that contains a third content different from a content within portions of said first file, wherein said third header identifies said third portion of said second file; and
   appending said third header to a storage location of a third content of said third portion.

8. A non-transitory computer readable storage medium having stored thereon, computer executable instructions that, if executed by a computer system cause the computer system to perform a method of maintaining and providing information relating to data deduplication comprising:
   identifying a first portion of a first file and a second portion of a second file that contain a first content;
   creating a first header associated with said first portion, wherein said first header identifies said first portion and said second portion containing said first content and wherein said first portion is identified as within said first file and said second portion is identified as within said second file;

appending said first header to a storage location of said first content of said first portion to form a first data structure for said first file; and storing said first data structure.

9. The non-transitory computer readable storage medium as described by claim 8, wherein said method further comprises:

identifying a third portion of said first file that contains a second content different from content within portions of said second file.

10. The non-transitory computer readable storage medium as described by claim 9, wherein said method further comprises:

creating a second header associated with said third portion, wherein said second header identifies said third portion of said first file; and appending said second header to a storage location of said second content of said third portion.

11. The non-transitory computer readable storage medium as described by claim 8, wherein said method further comprises:

responsive to an application requesting access to said first file, a file system providing said first data structure to said application requesting said first file.

12. The non-transitory computer readable storage medium as described by claim 11, wherein said method further comprises:

creating a second header associated with said second portion, wherein said second header identifies said second portion and said first portion containing said first content and wherein said first portion is identified as within said first file and said second portion is identified as within said second file;

appending said second header to a storage location of said first content of said second portion to form a second data structure for said second file; and storing said second data structure.

13. The non-transitory computer readable storage medium as described by claim 12, wherein said method further comprises:

responsive to an application requesting access to said second file, a file system providing said second data structure to said application requesting said second file.

14. The non-transitory computer readable storage medium as described by claim 12, wherein said method further comprises:

creating a third header associated with a third portion of said second file that contains a third content different from a content within portions of said first file, wherein said third header identifies said third portion of said second file; and appending said third header to a storage location of a third content of said third portion.

15. A storage cluster system, comprising:

a computer system comprising a file system and one or more processors coupled to a computer readable storage media and configurable to execute computer readable code stored on the computer readable storage media which causes said file system to implement a method comprising:

identifying a first portion of a first file and a second portion of a second file that contain a first content;

creating a first header associated with said first portion, wherein said first header identifies said first portion and said second portion containing said first content and wherein said first portion is identified as within said first file and said second portion is identified as within said second file;

appending said first header to a storage location of said first content of said first portion to form a first data structure for said first file; and storing said first data structure.

16. The storage cluster system as described by claim 15, wherein said method further comprises:

identifying a third portion of said first file that contains a second content different from content within portions of said second file.

17. The storage cluster system as described by claim 16, wherein said method further comprises:

creating a second header associated with said third portion, wherein said second header identifies said third portion of said first file; and appending said second header to a storage location of said second content of said third portion.

18. The storage cluster system as described by claim 15, wherein said method further comprises:

responsive to an application requesting said first file, providing said first data structure to said application requesting said first file.

19. The storage cluster system as described by claim 18, wherein said method further comprises:

creating a second header associated with said second portion, wherein said second header identifies said second portion and said first portion containing said first content and wherein said first portion is identified as within said first file and said second portion is identified as within said second file;

appending said second header to a storage location of said first content of said second portion to form a second data structure for said second file; and storing said second data structure.

20. The storage cluster system as described by claim 19, wherein said method further comprises:

creating a third header associated with a third portion of said second file that contains a third content different from a content within portions of said first file, wherein said third header identifies said third portion of said second file; and appending said third header to a storage location of a third content of said third portion.

* * * * *